United States Patent
Bareiss et al.

[11] Patent Number: 5,711,583
[45] Date of Patent: Jan. 27, 1998

[54] MAGNETIC CONTROL VALVE FOR A SLIP-CONTROLLED HYDRAULIC BRAKE SYSTEM FOR MOTOR VEHICLES

[75] Inventors: Alexander Bareiss; Michael Krauter, both of Charleston, S.C.

[73] Assignee: Robert Bosch GmbH, Stuttgart, Germany

[21] Appl. No.: 701,434

[22] Filed: Aug. 22, 1996

[30] Foreign Application Priority Data

Aug. 23, 1995 [DE] Germany .............. 195 31 010.1

[51] Int. Cl.$^6$ .................................................. B60T 8/36
[52] U.S. Cl. .............. 303/119.2; 137/529; 137/630.15; 251/129.19
[58] Field of Search ............... 303/116.4, 119.2; 137/529, 630, 630.15; 251/129.07, 129.19, 77

[56] References Cited

U.S. PATENT DOCUMENTS 2,575,272  11/1951  Harris ............................ 137/629
4,274,444  6/1981   Ruyak ........................... 137/630.15 X

*Primary Examiner*—Lee W. Young
*Attorney, Agent, or Firm*—Edwin E. Greigg; Ronald E. Greigg

[57] ABSTRACT

A magnetic valve that switches at high differential pressures and furnishes a large flow cross section. The magnetic valve has an armature, which when current is supplied to a coil is movable toward a pole core counter to the force of a restoring spring. The armature is capable of opening an auxiliary valve of small sealing diameter directly and a main valve of large sealing diameter indirectly. The auxiliary valve and the main valve have a common closing body, which is movable relative to the armature with a limited stroke. The auxiliary valve communicates through a conduit of the closing body with the outflow side of the magnetic valve. In the open position of the magnetic valve, the closing body is held by a stop ring of the armature. The magnetic valve is suitable in particular for slip-controlled hydraulic brake systems of motor vehicles.

5 Claims, 2 Drawing Sheets

MAGNETIC CONTROL VALVE FOR A SLIP-CONTROLLED HYDRAULIC BRAKE SYSTEM FOR MOTOR VEHICLES

BACKGROUND OF THE INVENTION

The invention is based on a magnetic valve for a slip-controlled hydraulic brake system for motor vehicles.

A magnetic valve of this type is already known (German Patent DE 25 40 599 C2), in which the valve seat of the auxiliary valve is formed directly on the armature, and the closing body that is common to both the auxiliary valve and the main valve comprises a rubber-elastic material. Because of the limited wear resistance of these parts, the suitability of the known magnetic valve for switching relatively slight pressures of a hydraulic media is therefore limited. Moreover, on the face end of the armature, for receiving the disk like closing body, an axially relatively deep recess is provided, which has a shoulder on the orifice side that serves to limit the closing body stroke relative to the armature after the opening of the xb. Only a small portion of the armature stroke is therefore available for opening the hb. Furthermore, the closing body stroke is not adjustable but instead depends only on the depth of the recess on the armature and on the disk thickness of the closing body.

OBJECT AND SUMMARY OF THE INVENTION

The magnetic valve of the invention has the advantage over the prior art that the auxiliary valve seat, regardless of the material of the armature, which is preferably adapted to the properties of the magnet circuit, can be formed on a component of a material that meets the demands of the hydraulic circuit in which the magnetic valve is used. Thus using the embodiment of the invention makes a highly wear-proof, heavy-duty embodiment of the main valve possible; thus with a suitably adapted closing body and main valve seat, the magnetic valve can be used in hydraulic motor vehicle brake systems, where very high pressures can occur and the demands for a failsafe nature of the components are great. With the embodiment of the invention it is also possible in a simple way to adapt the closing body stroke to suit the press-fitted depth of the stop ring opposite the main valve seat and/or to the armature stroke.

Advantageous further features of and improvements to the magnetic valve are possible with the provisions recited herein.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
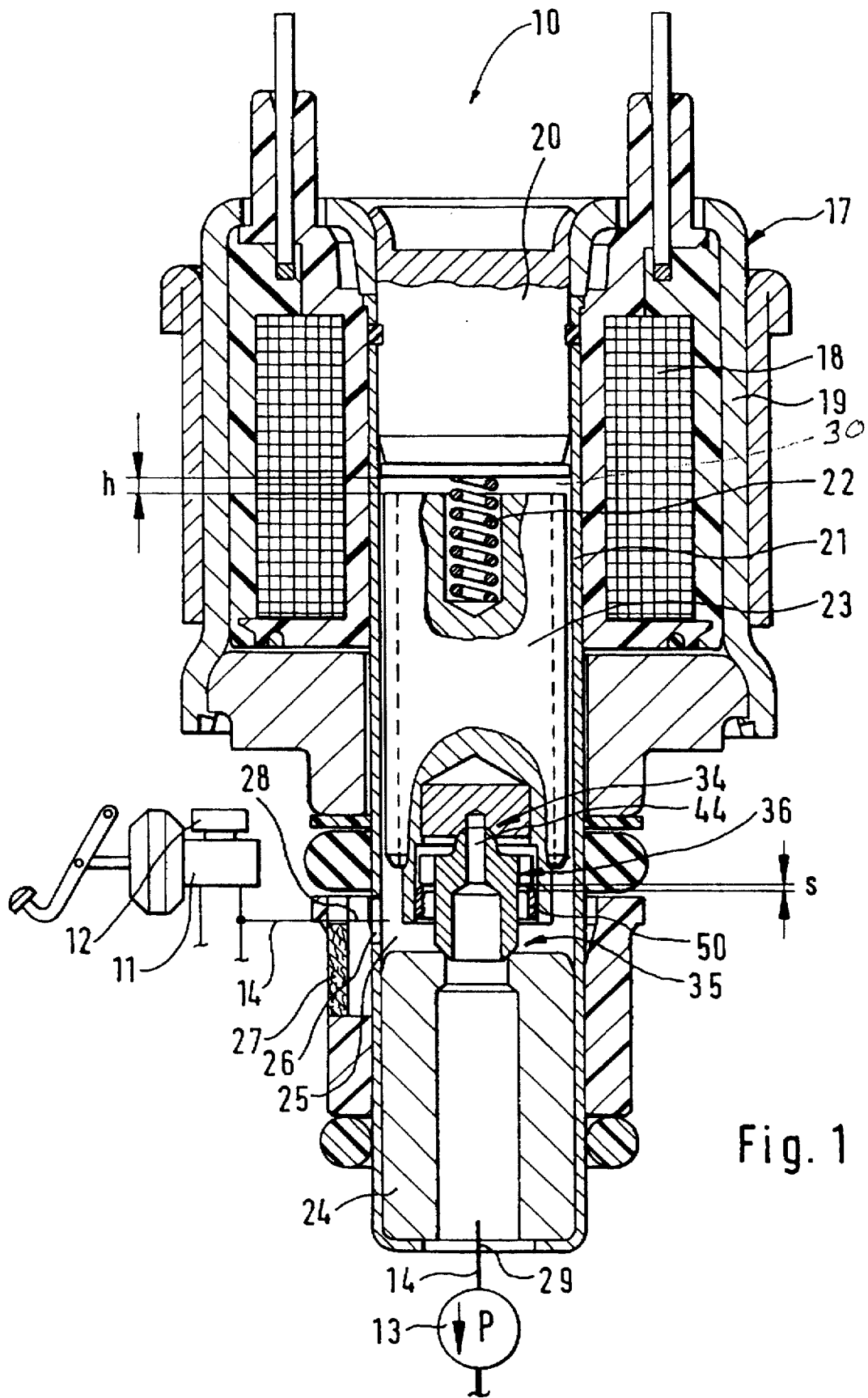
FIG. 1 is a longitudinal section of the magnetic valve with an auxiliary valve in an armature.
Figure 2:
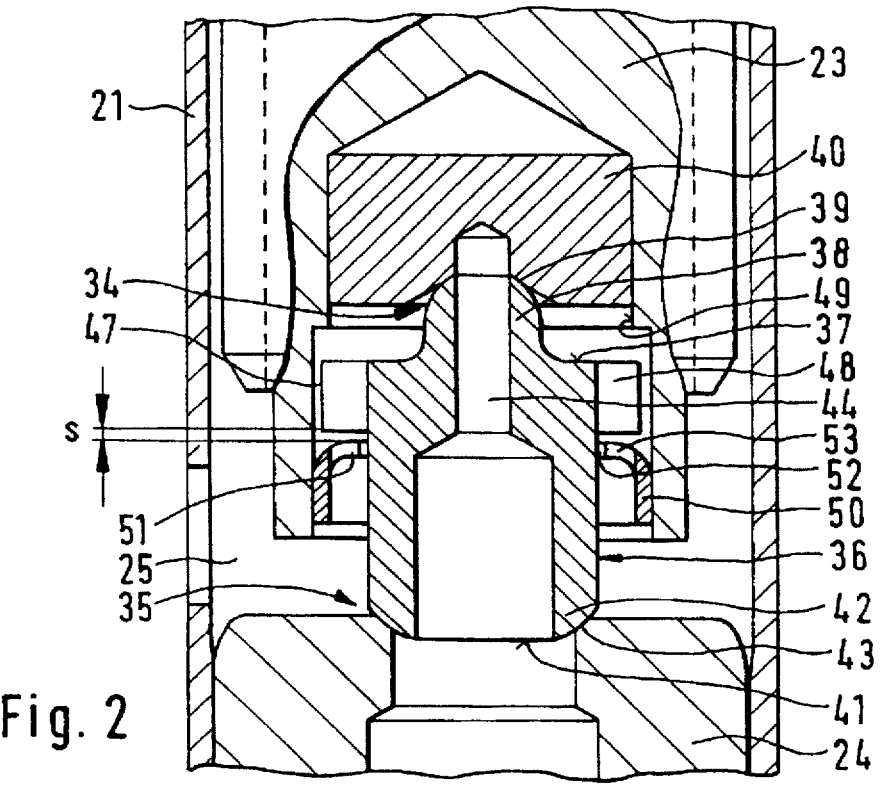
FIG. 2 shows the auxiliary valve Of FIG. 1 on a larger scale.

The first exemplary embodiment shown in FIGS. 1 and 2 shows a magnetic valve 10 for use in a slip-controlled hydraulic brake system for motor vehicles, of which in FIG. 1 of the drawing only a master cylinder 11 with a supply tank 12 for pressure fluid and a high-pressure pump for pumping fluid to the brake system 13 are shown. One such brake system is shown in German Patent Application DE 44 41 791 A1, which was not published prior to the priority date of the present application. It is designed not only for anti-lock braking but also for traction control, as well as for automatic braking for the sake of lateral-slip control (drive dynamics control) and to reinforce driver-actuated braking (brake assistant). It is therefore an essential demand of the magnetic valve 10 of the invention, which is located in an intake line 14 extending between the master cylinder 11 and the pump 13, is to open even counter to a brake pressure generated by the master cylinder 11 and to uncover a relatively large flow cross section, so that the pump 13 can pump an adequately large volumetric stream, even at low temperatures, in particular to the brake system.

The magnetic valve 10 has an electromagnet 17, which substantially comprises a coil 18, a housing jacket 19, and a pole core 20. The pole core 20 is tightly welded to a guide sleeve 21 for an armature 23 that is longitudinally movable toward the pole core counter to the force of a prestressed restoring spring 22. On its other end, the other guide sleeve 21 is tightly joined to a valve body 24. Between the armature 23 and the valve body 24, a first valve chamber 25 is formed in the guide sleeve 21; through both an opening 26 in the guide sleeve and a filter 27, this valve chamber communicates unthrottled with the inflow side 28 of the magnetic valve 10. The aforementioned intake line 14 leads from the inflow side 28 to the master cylinder 11. The outflow side 29 of the magnetic valve 10 is located on the outlet side of the valve body 24, which has a longitudinal hole drilled through it. The outflow side 29 communicates through the intake line 14 with the intake side of the pump 13 which pumps fluid to the brake system. In addition to the first valve chamber 25, the magnetic valve 10 has a second valve chamber 30, formed between the pole core 20 and the armature 23. The two valve chambers 25 and 30 communicate with one another through longitudinal grooves 31 of the armature 23. The armature 23 is accordingly bathed by pressure fluid.

The magnetic valve 10 switches the passage between the inflow side 28 and the outflow side 29 with an auxiliary valve 34 and a main valve 35. The auxiliary valve 34 and the main valve 35 are seat valves, with a common closing body 36. The closing body is a substantially cylindrical turned part made of steel. On its face end 37 toward the pole core, the closing body 36 is provided with an approximately hemispherical auxiliary closure piece 38 of the auxiliary valve 34 (FIG. 2). On its face end 41 remote from the pole core, the closing body 36 has the main closing piece 42 of the main valve 35. The main closing piece 42, in the form of a spherical washer, cooperates with a main valve seat 43, embodied as a hollow cone, on the valve body 24. The closing body 36 is provided with a stepped through bore 44, which originates at the auxiliary closing piece 38 of small diameter and discharges into the main closing piece 42 of large diameter. Accordingly, the auxiliary valve 34 communicates directly with the outflow side 29 of the magnetic valve 10 by means of a conduit, formed by the through bore 44 of the closing body 36, and the main valve 35. The closing body 36 is equipped on its circumference, in the region of its face end 37 toward the pole core, with an encompassing collar 47 that has a plurality of openings 48. The closing body 36 engages a blind bore 49 on the end of the armature 23 remote from the pole core. The disk 40 provided with the auxiliary valve seat 39 is located on the bottom of the bore 49. This disk is press-fitted into the bore 49 of the armature 23, or caulked in the bore. On the discharge side, a stop ring 50 is located in the bore 49 of the armature 23. It is likewise press-fitted into the bore 49. The stop ring 50 has a radially inwardly oriented shoulder 51, which defines an opening 52 of the stop ring 50 that is engaged by the closing body 36. Recesses 53 are located in the shoulder 51 and act as a pressure-fluid-carrying connection between the valve chamber 25 and the armature bore 49. The shoulder 51 of the stop ring 50 extends parallel to the collar 47 of the closing body 36, this collar being guided in the bore 49 of the armature 23. The stop ring 50 limits the stroke s of the closing body 36 to a value that is less than the armature stroke h. The closing body stroke s is at the same the stroke of the auxiliary valve 34.

The mode of operation of the magnetic valve 10 is as follows:

Supplying current to the coil 18 switches the magnetic valve 10 over from the blocking position, shown, into the open position, in which the inflow side 28 communicates with the outflow side 29 through the opened main valve 35. The magnetic force exerted on the armature 23 upon the switch over is at its lowest value at the beginning of the armature stroke h. Once the armature stroke h has been traversed, in other words, once the armature 23 engages the pole core 20, the magnetic force attains its highest value.

When there is a pressure equilibrium on the inflow side 28 and the outflow side 29 of the magnetic valve, no hydraulic closing forces are operative upon the armature 23 and the closing body 36. To open the magnetic valve 10, the magnetic force therefore needs to overcome only the biasing force of the restoring spring 22.

Conversely, if a higher pressure prevails on the inflow side 28 than on the outflow side 29 when the magnetic valve 10 is closed, or in other words as a result of actuation of the master cylinder 11, then the armature 23 and the closing body 36 are not in pressure equilibrium; hydraulic closing forces are operative upon both the armature and the closing body. The closing force at the armature 23 is dependent on the sealing area of the auxiliary valve 34; the closing force on the closing body 36 is dependent on the sealing area of the main valve 35, minus the sealing area of the auxiliary valve 34. The hydraulic closing force exerted in the closing body 36 is considerably greater, because of the large cross section of the main valve 35, than the closing force exterted on the armature 23. To open the auxiliary valve 34, the low magnetic force of the beginning of the armature stroke h must therefore, as the armature 23 moves toward the pole core 20, overcome both the biasing force of the restoring spring 22 and the hydraulic closing force exerted on the armature. Through the auxiliary valve 34 that opens to an increasing extent over the further course of armature motion, pressure fluid now flows from the inflow side 28 through the chamber 25, the recesses 53 and openings 48 in the stop ring 50 and the closing collar 47, through the through bore 44 of the closing body 36, to the outflow side 29, resulting in a lessening of the pressure difference and a reduction in the closing force acting upon the closing body 36. In the further course of the armature motion, at the closing body stroke s=0, the shoulder 51 of the strop ring 50 strikes the collar 47 of the closing body 36. The considerably greater magnetic force during this phase of the armature motion is capable, together with the inertia of the armature 25, of overcoming the hydraulic closing force burdening the closing body 36 and of lifting the closing body from the valve body 24. This opens the main valve 35. At the end of the armature opening stroke, or in other words once the armature 23 engages the pole core 20, the main valve 35 assumes its maximum possible flow cross section.

The closing body stroke s can be dimensioned by suitable adjustment of the press-fit depth of the stop ring 50 in the armature bore 49. To achieve reliable opening of the main valve 35 even when there are very great pressure differences at the magnetic valve 10, the closing body stroke s can be made to approximate the armature stroke h, at the expense of the flow cross section at the main valve 35.

The ensuing description of the second exemplary embodiment, only differences in the exemplary embodiment already described will be mentioned. If characteristics shown in the drawing are not mentioned below, then they are the same as the characteristics in the exemplary embodiment of FIGS. 1 and 2.

Figure 3:
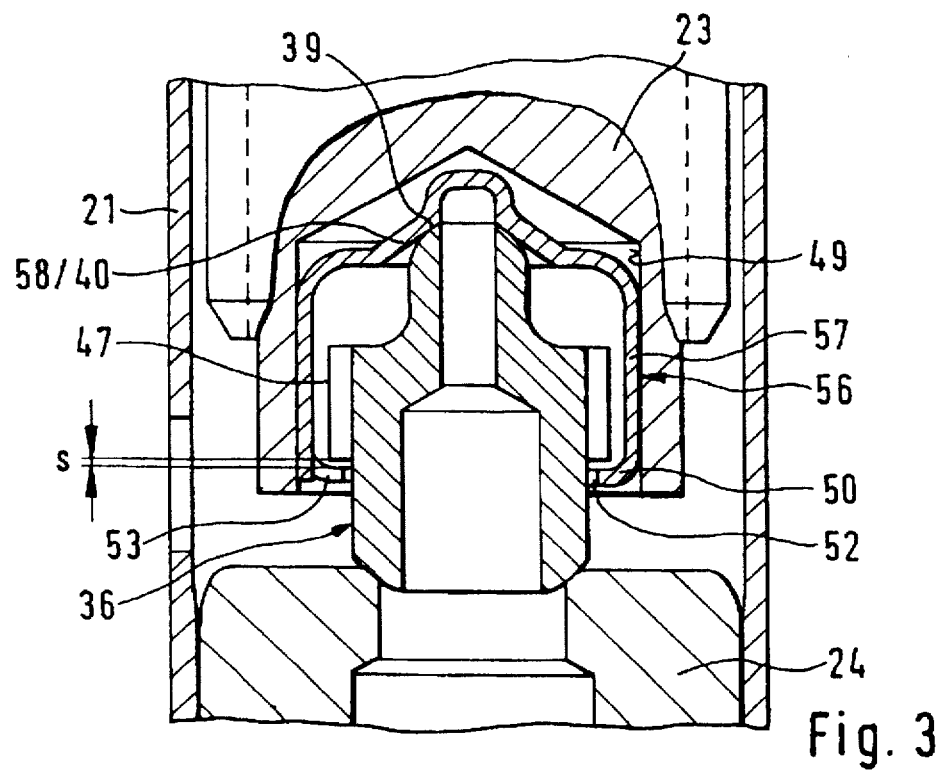
FIG. 3 shows a variant of the auxiliary valve.

The essential difference in the exemplary embodiment of FIG. 3 compared with that of FIGS. 1 and 2 is that the stop ring 50 and disk 40 are united in one component, which takes the form of a thin-walled steel sleeve 56. The sleeve 56 is press-fitted by its jacket wall 57 into the bore 49 of the armature 23. On the discharge side, it has an inward-oriented shoulder 51 with recesses 53 for the passage of pressure fluid into the bore 49. The shoulder 51, in cooperation with the collar 47 of the closing body 36, defines the closing body stroke s. A bottom wall 58 of the sleeve 56 that extends in the direction of the bore bottom and acts like the disk 40 of FIG. 2 is stamped in the shape of a hollow cone and acts as an auxiliary valve seat 39.

The sleeve 56 and the closing body 36, in this exemplary embodiment, form a pre-mountable component unit with only two individual parts. The component unit can be mounted on the armature 23 by press-fitting of the sleeve 56 thereon. The size of the closing body stroke s is predetermined by the dimensions of the sleeve 56 and closing body 36 and cannot be changed by the press-fitting operation.

The function of the magnetic valve equipped as in FIG. 3 is the same as in the exemplary embodiment described first.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A magnetic control valve (10), for disposition in an intake line (14), that extends between a master cylinder (11) and an intake side of a pump (13), of a slip-controlled hydraulic brake system for motor vehicles comprising:

an armature (23) that is longitudinally movable toward a pole core (20) counter to a force of a restoring spring (22) by an electromagnet (17);

the armature (23) directly opens an auxiliary valve (34), which comprises an auxiliary closing piece (38) and an auxiliary valve seat (39) of a small sealing diameter;

the armature (23) indirectly actuates a main valve (35), which has a main closing piece (42) and a main valve seat (43) of large sealing diameter;

the auxiliary valve (34) and the main valve (35) are disposed in a valve chamber (25), which communicates unthrottled with the inflow side (28) of the magnetic valve (10);

the auxiliary valve (34) and the main valve (35) have a common closing body (36) which is movable with a limited stroke relative to the armature (23) in an armature bore (49) and whose stroke (s) is smaller than the armature working stroke (h);

the auxiliary valve (34) communicates with the outflow side (29) of the magnetic valve (10) by means of a conduit (44) passing through the closing body (36) and the main valve (35) communicates directly with the outflow side (29) of the magnetic valve (10);

a disk (40) that has the auxiliary valve seat (39) and a stroke-limiting stop ring (50) are press-fitted into the bore (49) of the armature (23).

2. A magnetic valve in accordance with claim 1, in which the closing body (36) is a turned part, and on one face end (37) the closing body has the auxiliary closing piece (38) of the auxiliary valve (34), and on its other face end (41) it has the main closing piece (42) of the main valve (35); a coaxially extending through bore (44), begins at the auxiliary closing piece (38) of small diameter and discharges at the main closing piece (42) of large diameter is provided as a conduit; and that on its circumference the closing body (36) has a collar (47) with which it is at least indirectly guided in the bore (49) of the armature (23) and is braced on the stop ring (50) in the open position of the auxiliary valve (34).

3. A magnetic valve in accordance with claim 2, in which the disk (40) having the auxiliary valve seat (39) is embodied as a bottom (58), and the stop ring (50) having an inward-oriented shoulder (51) is embodied as part of a sleeve (56) pressed-fitted into the bore (49) of the armature (23).

4. A magnetic valve in accordance with claim 2, in which a shoulder (51) of the stop ring (50) and the collar (47) of the closing body (36) have at least one recess (53) or opening (48).

5. A magnetic valve in accordance with claim 3, in which the shoulder (51) of the stop ring (50) and the collar (47) of the closing body (36) have at least one recess (53) or opening (48).

* * * * *